United States Patent [19]

Radford et al.

[11] Patent Number: 4,587,087
[45] Date of Patent: May 6, 1986

[54] BURNABLE ABSORBER COATED NUCLEAR FUEL

[75] Inventors: Kenneth C. Radford, Irwin, Pa.; Beryl H. Parks, Lexington, S.C.

[73] Assignee: Westinghouse Electric Corp., Pittsburgh, Pa.

[21] Appl. No.: 468,788

[22] Filed: Feb. 22, 1983

[51] Int. Cl.⁴ .............................................. G21C 3/00
[52] U.S. Cl. .................................. 376/417; 376/414; 376/416; 376/419
[58] Field of Search ............... 376/419, 414, 415, 416, 376/417

[56] References Cited

U.S. PATENT DOCUMENTS 3,108,936 10/1963 Gale ...................................... 376/414
3,427,222 2/1969 Biancheria .......................... 376/414

FOREIGN PATENT DOCUMENTS 52999   1/1977  Japan .
859206  1/1961  United Kingdom .
933500  8/1963  United Kingdom .

OTHER PUBLICATIONS

Holden, A. N.; "Dispersion Fuel Elements", Gordon & Breach Science Publishers, N.Y. 1967; pp. 17, 30, 31, 45–49.

Primary Examiner—Donald P. Walsh
Attorney, Agent, or Firm—D. E. Erickson

[57] ABSTRACT

A burnable absorber coated nuclear fuel. A fissionable material nuclear fuel substrate is at least partially covered by a burnable absorber layer. A hydrophobic material overcoat layer generally covers the burnable absorber layer and is bonded directly to it.

10 Claims, 4 Drawing Figures

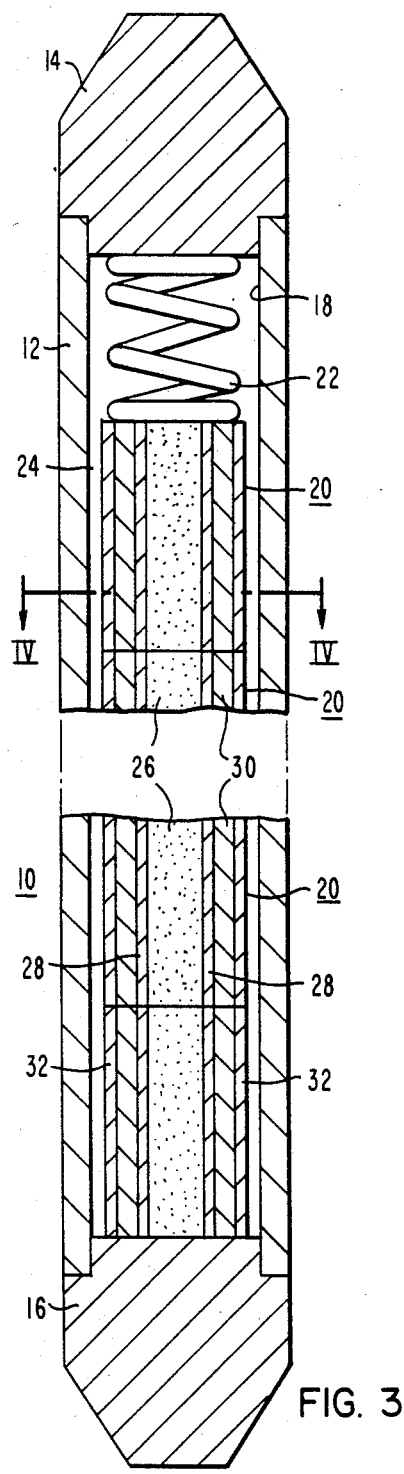
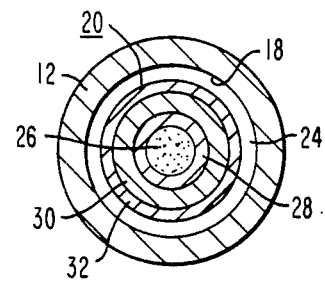
FIG. 3
FIG. 4

BURNABLE ABSORBER COATED NUCLEAR FUEL

BACKGROUND OF THE INVENTION

The present invention relates generally to burnalbe absorbers (also called burnable poisons) for nuclear reactors and, more particularly, to an improved burnable absorber coating for nuclear fuel.

It is known that nuclear fuel may have various shapes such as plates, columns, and even fuel pellets disposed in end-to-end abutment within a tube or cladding made of a zirconium alloy or stainless steel. The fuel pellets contain fissionable material, such as uranium dioxide, thorium dioxide, plutonium dioxide, or mixtures thereof. The fuel rods are usually grouped together to form a fuel assembly. The fuel assemblies are arranged together to constitute the core of a nuclear reactor.

It is well known that the process of nuclear fission involves the disintegration of the fissionable nuclear fuel material into two or more fission products of lower mass number. Among other things the process also includes a net increase in the number of available free neutrons which are the basis for a self-sustaining reaction. When a reactor has operated over a period of time the fuel assembly with fissionable material must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable absorbers" if they have a high probability (or cross section) for absorbing neutrons while producing no new or additional neutrons or changing into new absorbers as a result of neutron absorption. During reactor operation the burnable absorbers are progressively reduced in amount so that there is a compensation made with respect to the concomitant reduction in the fissionable material.

The life of a fuel assembly may be extended by combining an initially larger amount of fissionable material as well as a calculated amount of burnable absorber. During the early stages of operation of such a fuel assmebly, escessive neutrons are absorbed by the burnable absorber which undergoes transformation to elements of low neutron cross section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fuel and burnable absorber in carefully proportioned quantity, an extended fuel assembly life can be achieved with relatively constant neutron production and reactivity.

Burnable absorvers which may be used include boron, gadolinium, samarium, europium, and the like, which upon the absorption of neutrons result in isotopes of sufficiently low neutron capture cross section so as to be substantially transparent to neutrons.

The incorporation of burnable absorbers in fuel assemblies has been recognized in the nuclear field as an effective means of increasing fuel capacity and thereby extending core life. Burnable absorbers are used either uniformly mixed with the fuel (i.e., distributed absorber) or are placed discretely as separate elements in the reactor, so arranged that they burn out or are depleted at about the same rate as the fuel. Thus, the net reactivity of the core is maintained relatively constant over the active life of the core.

In U.S. Pat. No. 3,108,936 a magnesium zirconate or zirconium carbide protective fluid-tight coating is applied on uranium carbide fuel pellets allegedly so that if the fuel rod leaked, moisture from the water coolant would not reach the uranium carbide to react with it and change it to an unusable powdery oxide.

U.S. Pat. No. 3,427,222 discloses a uranium dioxide fuel pellet substrate coated with a mixture of uranium dioxide and a zirconium diboride burnable poison applied by a plasma spraying technique (see column 4, "Example I"). That patent also disclosed a uranium dioxide fuel pellet substrate coated with the burnable poison boron applied by chemical vapor deposition, and the patent noted that the deposition rate was slow at low temperatures while the coating was not as adherent at high temperatures (see column 5, "Example III").

It is known that a nuclear fuel contained in an aluminum can may be coated with a layer of niobium to prevent the fuel from reacting with the can (British Pat. No. 859,206; page 1; lines 12-30). It is also known that minute nuclear fuel particles, such as uranium dioxide particles, may be coated with a single layer or several layers of the same or different non-absorber materials, including niobium, for such purposes as protecting the fuel from corrosion and helping to retain the products of fission. The coatings may be applied by various techniques, such as depositing from a vapor of the coating material, depositing from a decomposing vapor, and electroplating (British Pat. No. 933,500).

Japanese Pat. No. 52-3999 discloses a nuclear fuel first coated with a thin layer of a material (such as niobium) to absorb fission fragments and then coated with a main coating material (such as a Zircaloy). The patent apparently does not concern burnable absorber coatings, and is not relevant to the present invention.

In *Dispersion Fuel Elements,* an AEC Monograph by A. N. Holden published in 1967 by Gordon and Breach of New York there is mentioned coating fuel particles in dispersion fuels to prevent interaction of the particles with the matrix and to retain fission products (page 30). Uranium dioxide coated with niobium by vapor-phrase reduction is disclosed (page 48). Also disclosed is uranium dioxide coated with chromium, by vapor-phase reduction using chromium dichloride, which was deposited over a niobium undercoat (page 48).

The present inventors are aware of the earlier documented work disclosed in a commonly assigned U.S. patent application entitled "Coating a Uranium Dioxide Nuclear Fuel With a Zirconium Diboride Burnable Poison", by Walston Chubb, concomitantly filed with the present application, wherein spalling problems with chemically vapor depositing zirconium diboride on uranium dioxide were overcome by first deposition (by sputtering, chemical vapor deposition, etc.) a thin undercoat layer of niobium (of between about 3 microns and about 6 microns in thickness) on the uranium dioxide and then chemically vapor depositing the zirconium diboride on he niobium layer.

Fuel pellets coated with a boron containing burnable absorber such as elemental boron, boron-10 isotope (the isotope of elemental boron having the burnable absorber property), zirconium diboride, boron carbide, boron nitride, and the like suffer from varying degrees of moisture adsorption. For example, uranium dioxide fuel pellets coated with zirconium diboride, after manufacture, must be furnace dried in a time consuming operation and then loaded into the fuel rods in a low humidity glove box environment. This is required because the zirconium diboride, being hygroscopic, takes on a thin layer of moisture (moisture adsorption) from the air itself. The added lengthy drying step (typically about 1 to 3 hours at temperatures of 200°–600° C. in a vacuum of less than or equal to 1 torr) and humidity controlled pellet loading environment add to the time, complexity and the cost of the nuclear fuel processing line. Moisture is to be avoided in nuclear fuel because, as is known to those skilled in the art, excessive hydrogen in the fuel pellet, appearing mostly as moisture, causes hydriding of the Zircaloy fuel rod when the hydrogen is released from the fuel pellet during operation of the reactor. The resulting corrosive effects of the hydriding may cause a breach in the fuel rod material and result in radioactive particles leaking into the water circulating through the reactor.

SUMMARY OF THE INVENTION

Briefly stated, the invention is directed towards a burnable absorber coated nuclear fuel having a fissionable material substrate, a burnable absorber layer, and a hydrophobic material overcoat layer. The burnable absorber layer covers at least a part of the substrate. The overcoat layer generally covers the burnable absorber layer and is bonded directly to it.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings, in which:

FIG. 3 adds an undercoat layer to the fuel pellets of the fuel rod of FIG. 1.

FIG. 4 is a transverse sectional view along the line IV—IV of FIG. 3.

DETAILED DESCRIPTION OF THE INVENTION

Nuclear fuel includes uranium in the form of uranium dioxide (or thorium dioxide, plutonium dioxide, or mxitures thereof) pellets each having a generally cylindrical configurartion with an approximately one-third inch diameter and an approximately one-half inch length. Desirable zirconium diboride burnable absorber coating thicknesses on the fuel pellets include a thickness of between about 8 and 16 microns (and preferably of between about 9 and 10 microns which corresponds to a target boron-10 loading of generally 1.5 mg per lineal inch).

The degree of moisture adsorption depends on the technique used to deposit the zirconium diboride layer. It has been found that sputtering produces a somewhat porous coating which contributes to moisture adsorption, while chemical vapor deposition appears to have less moisture adsorption problems.

Figure 1:
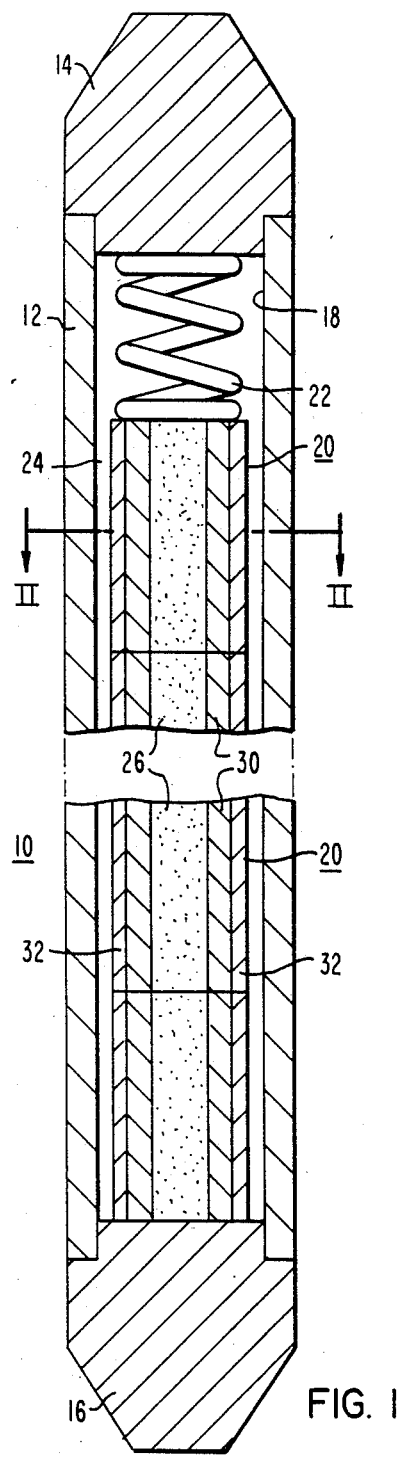
FIG. 1 is a longitudinal sectional view of a fuel rod containing burnable absorber coated fuel pellets having the non-hygroscopic overcoat layer of the invention.
Figure 2:
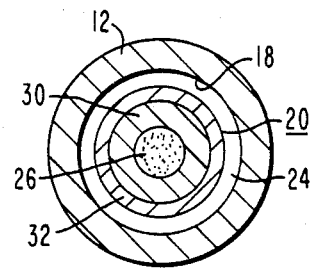
FIG. 2 is a transverse sectional view along the line II—II of FIG. 1.

Applicants' invention permits a burnable absorber coated nuclear fuel to be manufactured without the need for a lengthy fuel drying process or a special humidity-controlled fuel pellet loading environment. In applicants' invention, as seen in FIGS. 1 and 2, a fuel rod 10, for use in a nuclear reactor fuel assembly, includes an elongated tube 12 having a top end plug 14 and a bottom end plug 16 providing an enclosed chamber 18 in which a plurality of fissionable fuel pellets 20 are placed in end-to-end abutment biased against the bottom end plug 16 by the action of a spring 22. The pellet 20 diameter is slightly less than that of the tube 12 and forms a clearance space 24. Both the spring 22 and clearance space 24 accommodate any thermal expansion of the pellets 20 during operation.

Preferably the fissionable body portion or substrate 26 of the fuel pellet 20 consists essentially of uranium dioxide, although other forms of uranium, as well as plutonium or thorium, may be used. Also, preferably the burnable absorber layer 30 covering at least a part of the substrate 26 consists essentially of elemental boron or zirconium diboride, although other forms of boron, as well as gadolinium, samarium, europium, and the like, may be used.

To make the burnable absorber coated nuclear fuel pellet 20 non-hygroscopic (hydrophobic), the burnable absorber layer 30 is generally covered by an overcoat layer 32 which is directly bonded to it. The overcoat layer 32 contains a reactor compatible, hydrophobic material. Preferably the overcoat layer 32 has a thickness of between about 2 microns and about 6 microns. Of course, the overcoat layer 32 should be applied before the burnable absorber layer 30 has been exposed to air to avoid trapping any moisture (absorbed by the burnable absorber) in the fuel pellet 20. Reactor compatibility factors to be considered for such an overcoat layer include cost, neutron absorption cross section, compatibility with burnable absorbers, compatibility with the tube (cladding) 12, and melting point. Therefore, a reactor compatible, hydrophobic material is deemed to be a material chosen from the following group: niobium, zirconium, magnesium, aluminum, silicon, carbon, titanium, chromium, iron, nickel, copper, yttrium, molybdenum, barium, and cerium.

In a first preferred embodiment, elemental boron is used for the burnable absorber layer 30 and is bonded directly to the substrate 26 which is uranium dioxide, while the overcoat layer 32 consists essentially of niobium. In one example, uranium dioxide fuel pellets were coated by conventional chemical vapor deposition (CVD) techniques first with elemental boron and then with niobium utilizing a vertical pipe surrounding vertically stacked fuel pellets. The boron coating 30 was prepared via the pyrolysis of $B_2H_6$, and the niobium coating 32 was prepared via the hydrogen reduction of niobium pentachloride ($NbCl_5$). These gaseous CVD precursors were introduced into the bottom of the pipe and the by-products were exhausted from the top of the pipe. The fuel pellet substrates 26 had been cleaned by light sanding, repeated ultrasonic cleaning in distilled water, and vacuum drying. Thermocouples were mounted on the walls of the pipe. The pellet substrates 26 were heated to a thermocouple-measured predetermined wall temperature by an upper furnace while the precursor gases were preheated to a thermocouple-measured preselected wall temperature by a lower furnace. Satisfactory coatings were obtained under various conditions as summarized in Table 1.

eous zirconium chloride was prepared by reacting HCl and zirconium and carrying the reaction products in a hydrogen stream. Satisfactory coatings were obtained under various conditions as summarized in Table 2.

TABLE 2

SUMMARY OF CONDITIONS FOR PREPARING Nb/ZrB$_2$/Nb COATINGS

| Run No. | Layer | Run Time (min) | Temperatures (°C.) Gas Preheat | Temperatures (°C.) Pellet Zone | Flows (Mole Percent) BCl$_3$ | Flows (Mole Percent) HCl | Flows (Mole Percent) H$_2$ | Flows (Mole Percent) NbCl$_5$ | Flows (Mole Percent) ZrCl$_4$ | Total Flow (cc/min) |
|---|---|---|---|---|---|---|---|---|---|---|
| 1 | Nb | 45 | 650 | 850 | — | — | 99.921 | 0.079 | — | 15632 |
|   | ZrB$_2$ | 60 | 600 | 800 | 0.140 | 0.053 | 99.680 | — | 0.128 | 17098 |
|   | Nb | 67 | 650 | 850 | — | — | 99.946 | 0.054 | — | 15668 |
| 2 | Nb | 59 | 650 | 850 | — | — | 99.942 | 0.058 | — | 17089 |
|   | ZrB$_2$ | 37 | 600 | 805 | 0.279 | 0.204 | 99.298 | — | 0.220 | 17196 |
|   | Nb | 69 | 650 | 850 | — | — | 99.951 | 0.049 | — | 17088 |
| 3 | Nb | 44 | 643 | 865 | — | — | 99.907 | 0.093 | — | 17136 |
|   | ZrB$_2$ | 76 | 600 | 800 | 0.187 | 0.234 | 99.498 | — | 0.082 | 17114 |
|   | Nb | 48 | 650 | 850 | — | — | 99.915 | 0.085 | — | 17155 |
| 4 | Nb | 60 | 650 | 840 | — | — | 99.942 | 0.059 | — | 17195 |
|   | ZrB$_2$ | 80 | 605 | 805 | 0.279 | 0.204 | 99.298 | — | 0.220 | 17196 |
|   | Nb | 50 | 660 | 840 | — | — | 99.932 | 0.068 | — | 17197 |
| 5 | Nb | 55 | 650 | 855 | — | — | 99.941 | 0.059 | — | 17280 |
|   | ZrB$_2$ | 25 | 600 | 805 | 0.279 | 0.204 | 99.298 | — | 0.220 | 17196 |
|   | Nb | 55 | 650 | 843 | — | — | 99.938 | 0.062 | — | 17231 |
| 6 | Nb | 81 | 650 | 843 | — | — | 99.959 | 0.041 | — | 17192 |
|   | ZrB$_2$ | 27 | 600 | 804 | 0.279 | 0.204 | 99.298 | — | 0.220 | 17196 |
|   | Nb | 72 | 650 | 844 | — | — | 99.945 | 0.055 | — | 17194 |
| 7 | Nb | 27 | 650 | 870 | — | — | 99.811 | 0.189 | — | 17112 |
|   | ZrB$_2$ | 75 | 600 | 825 | 0.140 | 0.234 | 99.544 | — | 0.082 | 17106 |
|   | Nb | 33 | 650 | 890 | — | — | 99.870 | 0.130 | — | 17062 |
| 8 | Nb | 65 | 650 | 843 | — | — | 99.920 | 0.080 | — | 17199 |
|   | ZrB$_2$ | 37 | 602 | 803 | 0.279 | 0.204 | 99.298 | — | 0.220 | 17196 |
|   | Nb | 54 | 650 | 843 | — | — | 99.922 | 0.078 | — | 17153 |
| 9 | Nb | 64 | 650 | 860 | — | — | 99.936 | 0.064 | — | 17105 |
|   | ZrB$_2$ | 55 | 620 | 817 | 0.140 | 0.234 | 99.543 | — | 0.082 | 17106 |
|   | Nb | 77 | 650 | 853 | — | — | 99.946 | 0.054 | — | 17103 |
| 10 | Nb | 71 | 650 | 850 | — | — | 99.949 | 0.052 | — | 17194 |
|   | ZrB$_2$ | 37 | 600 | 810 | 0.279 | 0.204 | 99.298 | — | 0.220 | 17196 |
|   | Nb | 52 | 650 | 850 | — | — | 99.934 | 0.066 | — | 17196 |
| 11 | Nb | 69 | 650 | 848 | — | — | 99.956 | 0.044 | — | 17228 |
|   | ZrB$_2$ | 55 | 600 | 809 | 0.140 | 0.105 | 99.640 | — | 0.114 | 17101 |
|   | Nb | 77 | 650 | 845 | — | — | 99.956 | 0.044 | — | 17206 |

Typically, the invention is used to circumferentially surround (i.e., coat only the cylindrical wall of) the fuel

TABLE 1

SUMMARY OF CONDITIONS FOR PREPARING BORON/NIOBIUM COATINGS

| Run No. | Layer | Run Time (min) | Temperatures (°C.) Gas Preheat | Temperatures (°C.) Pellet Zone | Flows (Mole Percent) B$_2$H$_6$ | Flows (Mole Percent) H$_2$ | Flows (Mole Percent) NbCl$_5$ | Total Flow (cc/min) |
|---|---|---|---|---|---|---|---|---|
| 1 | B | 45 | 230 | 600 | 0.015 | 99.985 | — | 17010 |
|   | Nb | 172 | 650 | 850 | — | 99.938 | 0.062 | 16510 |
| 2 | B | 60 | 230 | 615 | 0.015 | 99.985 | — | 17010 |
|   | Nb | 20 | 650 | 850 | — | 99.983 | 0.107 | 16017 |
| 3 | B | 60 | 230 | 610 | 0.015 | 99.985 | — | 17010 |
|   | Nb | 35 | 650 | 850 | — | 99.909 | 0.091 | 16315 |
| 4 | B | 35 | 230 | 610 | 0.015 | 99.985 | — | 17010 |
|   | Nb | 34 | 650 | 845 | — | 99.946 | 0.054 | 17169 |

In a second preferred embodiment, as shown in FIGS. 3 and 4, zirconium diboride is used for the burnable absorber layer 30 and is bonded by CVD to an undercoat layer 28 of niobium, with the undercoat layer 28 being bonded by CVD to the substrate 26 which is uranium dioxide. The overcoat layer 32 consists essentially of CVD niobium. The necessity for an undercoat layer of niobium (or the like) when depositing zirconium diboride by chemical vapor deposition (CVD) on uranium dioxide has been previously mentioned. Preferably the undercoat layer 28 has a thickness of between about 3 microns and about 6 microns. The technique is similar to that discussed in the first preferred embodiment. The CVD precursor for the zirconium diboride was zirconium tetrachloride and boron trichloride. Gaseous zirconium chloride was prepared by reacting HCl and zirconium and carrying the reaction products in a hydrogen stream. Satisfactory coatings were obtained under various conditions as summarized in Table 2.

pellet substrate 26 with a burnable absorber layer 30 and the overcoat layer 32 (and the undercoat layer 28 if needed). However, in some applications it may be desirable to coat the entire fuel pellet substrate 26, including its top and bottom surfaces. In other applications, it may be advantageous to coat only a part of the nuclear fuel substrate with the burnable absorber layer and then generally cover (or partially cover) the burnable absorber layer with the overcoat layer. Also, where substrates, burnable absorber layers, and overcoats/undercoats may contain uranium dioxide, zirconium diboride, and niobium, respectively, it is preferred that they respectively consist essentially of such uranium dioxide, zirconium diboride, and niobium.

It will be apparent that many modifications and variations are possible in light of the above teachings. It, therefore, is to be understood that within the scope of the appended claims, the invention may be practiced other than as specifically described.

We claim:

1. A burnable absorber coated nuclear fuel comprising:
   (a) a nuclear fuel substrate containing a fissionable material;
   (b) a layer containing a burnable absorber covering at least a part of said substrate, said burnable absorber layer being substantially devoid of airborne moisture;
   (c) an overcoated layer containing a reactor compatible, hydrophobic material generally covering, and bonded directly to, said burnable absorber layer.

2. A nuclear reactor fuel assembly having a fuel rod containing a burnable absorber coated nuclear fuel, said nuclear fuel comprising:
   (a) a pellet substrate containing a fissionable material;
   (b) a layer containing a burnable absorber covering at least a part of said pellet substrate, said burnable absorber layer being substantially devoid of airborne moisture;
   (c) an overcoat layer containing a reactor compatible, hydrophobic material generally covering, and bonded directly to, said burnable absorber layer.

3. The nuclear reactor fuel assembly of claim 2, wherein said pellet substrate consists essentially of uranium dioxide.

4. The nuclear reactor fuel assembly of claim 2, wherein said burnable absorber layer comprises a boron containing material.

5. The nuclear reactor fuel assembly of claim 2, wherein said burnable absorber layer consists essentially of boron and is bonded directly to said pellet substrate.

6. The nuclear reactor fuel assembly of claim 2, wherein said overcoat layer consists essentially of niobium.

7. The nuclear reactor fuel assembly of claim 2, wherein said pellet substrate is generally cylindrically shaped having a diameter of about one-third inch and a length of about one-half inch, wherein said burnable absorber layer has a thickness of between about 8 microns and about 16 microns, and wherein said overcoat layer has a thickness of between about 2 microns and about 6 microns.

8. The nuclear reactor fuel assembly of claim 2, also including an undercoat layer containing niobium disposed between, and bonded directly to, said pellet substrate and said burnable absorber layer, and wherein said burnable absorber layer consists essentially of zirconium diboride.

9. The nuclear reactor fuel assembly of claim 8, wherein said undercoat layer consists essentially of niobium.

10. The nuclear reactor fuel assembly of claim 8, wherein said undercoat layer has a thickness of between about 3 microns and about 6 microns.

* * * * *